United States Patent [19]

Fogaroli et al.

[11] Patent Number: 4,954,888
[45] Date of Patent: Sep. 4, 1990

[54] APPARATUS FOR READING AND DIGITAL PROCESSING OF COLOR IMAGES

[75] Inventors: Giuseppe Fogaroli, Ivrea; Giuseppe Coli, Chiaverano; Giorgio Tadini, Corso Giovanni Pascoli; Giampiero Meazza, Ivrea, all of Italy

[73] Assignee: Ing. C. Olivetti & C., S. p. A., Ivrea, Italy

[21] Appl. No.: 309,085

[22] Filed: Feb. 6, 1989

[30] Foreign Application Priority Data

Mar. 18, 1988 [IT] Italy ................................. 67232 A/88

[51] Int. Cl.⁵ ............................................... H04N 1/46
[52] U.S. Cl. .......................................... 358/75; 358/80
[58] Field of Search ......................... 358/75, 78, 79, 80

[56] References Cited

U.S. PATENT DOCUMENTS 4,517,590  5/1985  Nagashima et al. ................... 358/75
4,663,662  5/1987  Sekizawa et al. ..................... 358/75
4,739,397  4/1988  Hayashi ................................. 358/75

Primary Examiner—James J. Groody
Assistant Examiner—Mark R. Powell
Attorney, Agent, or Firm—Banner, Birch, McKie & Beckett

[57] ABSTRACT

The apparatus for reading and digital processing of color images comprises groups of CCD sensing elements for reading the individual pixels forming the image. Each group of the sensing elements is associated with one primary color, for generating corresponding reading signals, which control a color indication circuit generating a color indicatory signal for indicating the presence of any color in the image. The colour indicator signal is derived from a table of zones of colours which is recorded in a ROM and can be addressed by the reading signals of the various colours, input from corresponding reading elements via compensation circuits. The colour signal is capable of controlling second selective scanning of document for recording the reading signals for all the primary colours of the image. The ROM is also capable of providing an indication of the mixture of colours of each pixel, which is compared to a predetermined mask for the purposes of suppressing a particular mixture of colours from the recording.

12 Claims, 3 Drawing Sheets

APPARATUS FOR READING AND DIGITAL PROCESSING OF COLOR IMAGES

BACKGROUND OF THE INVENTION

1. Field of the Invention

The present invention relates to an apparatus for reading and digital processing of colour images comprising a group of pluralities of elements for reading the individual pixel associated with the primary colours of the image for generating corresponding reading signals, and comprising reading mode selection means for selection for monochrome output the reading signals generated by a predetermined one of said pluralities of elements, the group of pluralities of elements being operable to control a colour indication circuit for indicating the presence of any colour in the image, the selection means being capable of enabling that circuit to output the colour indication in association with the reading signal generated by the predetermined one plurality of elements.

2. Description of the Related Art

Various apparatuses for reading multi-colour images are known, including filters which are associated with the various colours and which are rendered active sequentially for reading the corresponding colours.

However, on the one hand these apparatuses are capable of encoding the individual colours only in a binary mode, so that it is not possible to encode halftones, while on the other hand they must be set up on each occasion for making a selection between reading in black and white and reading in colours.

U.S. Pat. No. 4,554,594 of the present assignee also discloses an apparatus for reading documents with monochrome images, in which encoding of the pixels is effected selectively in a binary mode when dealing with line images (characters of graphics) or a multi-level mode of greys when dealing with half-tone images. However that apparatus is not capable of effecting selection at a plurality of levels of encoding when reading colour images.

SUMMARY OF THE INVENTION

The object of the invention is to make it possible to select the reading mode and signal encoding without any manual pre-setting.

The object of the invention is obtained by means of an apparatus for reading and digital processing of colour images comprising a group of pluralities of elements for reading the individual pixels associated with the primary colours of the image for generating corresponding reading signals, and comprising reading mode selection means for selection for monochrome output the reading signal generated by a predetermined one of said pluralities of elements being operable to control a colour indication circuit for indicating the presence of any colour in the image, the selection means being capable of enabling that circuit to output the colour indication in association with the reading signal generated by the predetermined one plurality of elements.

These and other features of the invention will be more clearly apparent from the following description of a preferred embodiment which is given by way of non-limiting example with reference to the accompanying drawings.

DESCRIPTION OF THE PREFERRED EMBODIMENT

Figure 1:
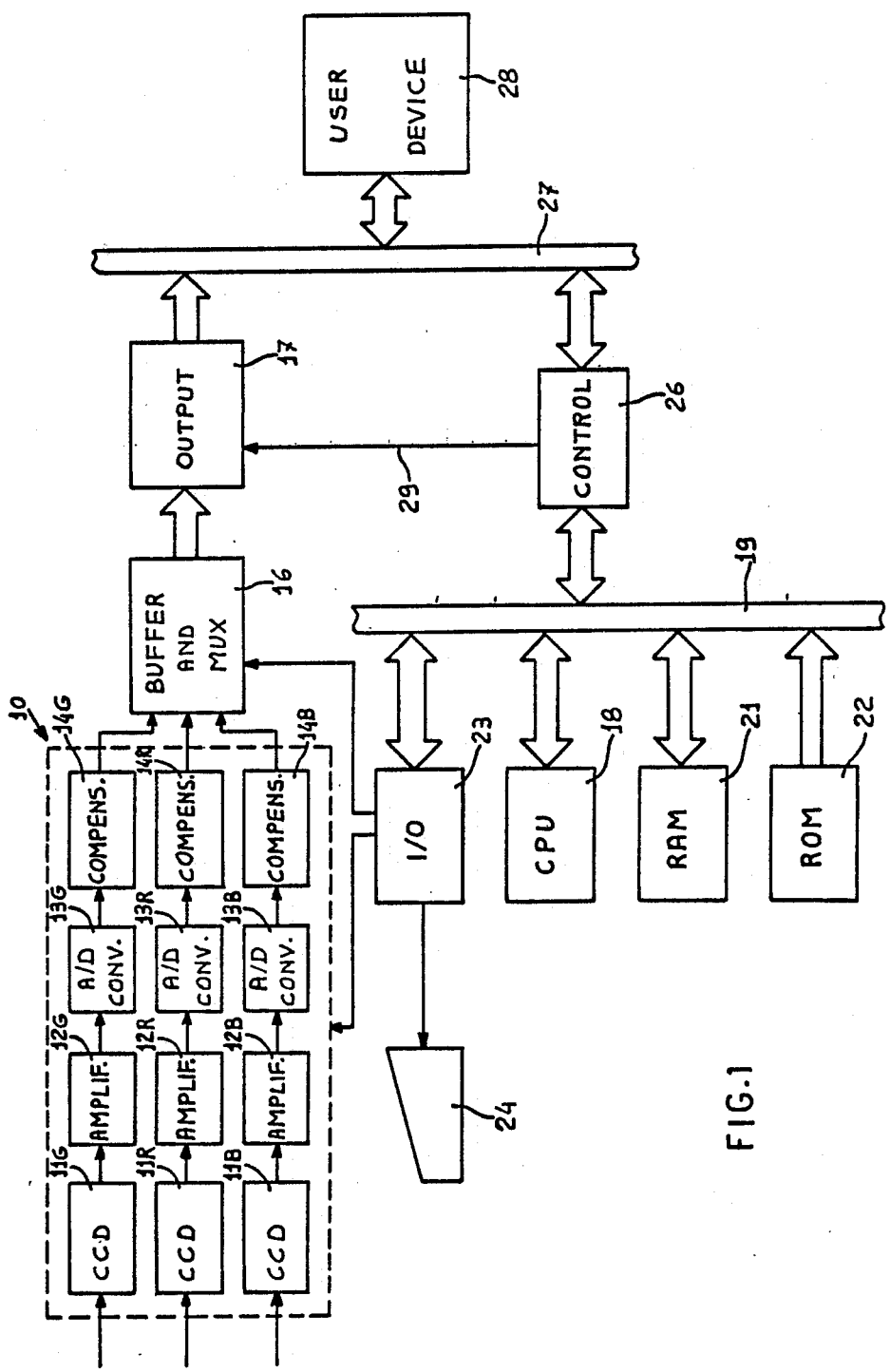
FIG. 1 is a block diagram of an apparatus for reading and digital processing of colour images, processing unit of the apparatus of FIG. 1 according to the invention.

Referring to FIG. 1, reference numeral 10 generally indicates a digital colour image reading device comprising three series or pluralities of reading elements 11G, 11R and 11B associated with the three primary colours: green, red and blue. Each of the three series of reading elements can be formed by a series of cells of a Charge Coupled Device (CCD).

The cells of each CCD are so spaced that each receives the reflected light from a small area of the document, hereinafter referred to as a 'pixel'. The number of pixels per mm which is generally between 8 and 16 may be varied by adjusting the objective lens which directs the light reflected by the document on to the CCDs.

The signals generated by each CCD are processed by a corresponding channel so that the components of the three channels are indicated by the same reference numerals followed by the letters G, R and B of the respective color. Only the channel associated with green is described hereinafter.

The signals generated by the CCD 11G are amplified by an amplifier 12G and converted into six-bit digital signals by an A/D converter 13G. Therefore each pixel can be represented by a digital value between 0 and 63. Those signals are then compensated in respect of amplitude in dependence on the background colour of a sample line by means of a compensation circuit 14G which is substantially of the type described in the present applicants' IT 1 183 816.

The output signals from the three compensation circuits 14G, 14R and 14B are applied to a buffer and multiplex block 16 which will be described in greater detail hereinafter and which is connected between the device 10 and an output circuit 17.

The image reading and processing apparatus is controlled by logic means comprising a central control unit or CPU 18, for example of the microprocessor type. The microprocessor is connected by way of a bus 19 to a working read-write memory or RAM 21 for data and programs, and a read only memory or ROM 22 for fixed data and firmware programmes.

Also connected to the bus 19 is an input-output port unit or I/O 23 for receiving manual commands from a keyboard 24 and transmitting the commands of the CPU to the various devices of the apparatus. In particular the input-output unit 23 can transmit the commands of the CPU 18 both to the reading channels of the device 10 and to the block 16.

Figure 2:
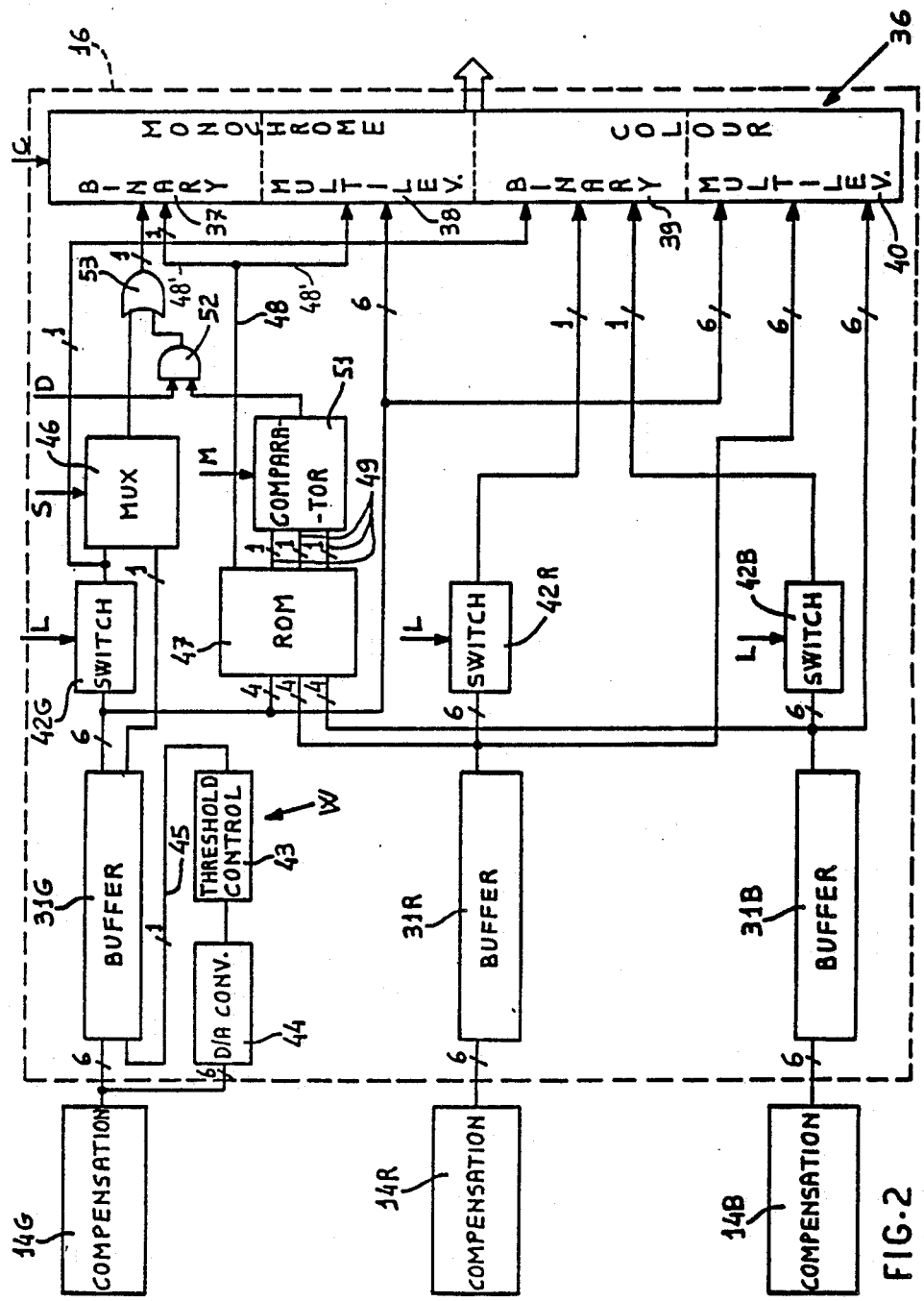
FIG. 2 is a diagrammatic view of the scanning device.

Finally, also connected to the bus 19 is an interface control unit 26 for example of the type IEEE 488 which controls the exchange of data between the bus 19 and an external bus 27 to which one or more user devices 28 can be connected. By way of a conductor 29 the unit 26 enables the output circuit 17 to apply to the bus 27 the reading signals which can thus be temporarily stored in the RAM 21 or used by the unit 28. The block 16 (FIG. 2) comprises a group of three buffers 31G, 31R and 31B for receiving the digital signals which are organised in six bits from the respective compensation circuits 14G, 14R and 14B. Each of these buffers 31G, 31R and 31B has a capacity of two lines of reading and thus two series of signals generated by the respective CCD, that is to say 2×6 bits for each pixel of the line of the document.

As will be better appreciated hereinafter, the reading apparatus can be conditioned by the CPU 18 to record images in the following modes:
(1) binary monochrome recording which requires the recording of one bit per pixel;
(2) multi-level monochrome recording which requires the recording of six bits per pixel;
(3) binary colour recording which requires the recording of three bits per pixel; and
(4) multi-level colour recording which requires the recording of eighteen bits per pixel.

For selection of the recording mode the CPU 18 is operable to generate, for example in execution of a suitable program instruction, a command C for selection as between monochrome recording and colour recording. In turn the block 16 comprises a multiplexer 36 provided with four data input zones 37, 38, 39 and 40, each for one of the four recording modes. The multiplexer 36 is operable to emit the data in the form of bytes, to pass them to the output circuit 17 (FIG. 1). The multiplexer 36 is also controlled by the signal C for alternatively enabling the two zones 37 and 38 of the data of the monochrome recording or the two zones 39 and 40 of the data of the colour recording.

The six bit outputs of the buffers 31G, 31R and 31B are connected to the zone 40 of the multiplexer 36.

In addition, for each colour channel the block 16 comprises a switching circuit 42G, 42R and 42B which receives the six bits from the associated buffer 31G, 31R and 31B. Each circuit 42G, 42R and 42B is conditioned by the command L which is represented by three bits. In a multi-level configuration (ML) the command L blocks the output of the circuits 42G, 42R and 42B whereby, in the presence of the command C, the six bits indicative of the level of each signal condition multilevel recording to the half-tones of each colour of the pixels. In the other configurations the command L conditions the emission of a single bit by each circuit 42G, 42R and 42B, which is indicative of the presence or absence of the associated colour, on the basis of a signal threshold indicated by the configuration of the command L. In that case the arrangement is conditioned for binary recording of each colour of the pixels.

By virtue of its particular level of chromatic sensitivity which includes sensitivity to black, the CCD 11G for green has been selected for reading images to be recorded in a monochrome mode. For that purpose the six bits of the buffer G are also applied to the zone 38 of the multiplexer 36 while the single output bit from the switch 42G is passed to the zone 37 of the multiplexer 36.

The buffer 31G for green is capable of storing, together with the six bits of each pixel, a binary pixel reading signal which is generated by a circuit 43 for automatic regulation of the threshold, in dependence on the threshold defined thereby. That threshold is defined as taking account of the conditions of the background and contrast of the image, which are derived from the reading of a series of pixels. The circuit 43 produces a combination of the signals with a positive peak and a negative peak and the current analog signal, in the manner described in detail in the U.S. patent application No. 309,086 filed on even date and entitled; 'Circuit for regulating the threshold of a reading signal for a device for digital scanning of images', assigned to the same assignee.

For that purpose the six bits which pass into the buffer 31G pass in parallel into a digital-analog converter 44 and determine a corresponding analog value. That value which is processed by the circuit 43, as described above, generates on its conductor 45 the binary reading signal which is stored in the buffer 31G and which can be extracted therefrom by a separate output from that of the six bits for complete reading.

The one-bit output of the green switching circuit 42G is also connected to a multiplexer 46 to which the variable-threshold output of the buffer 31G is also connected. The multiplexer 46 is controlled by a command S issued by the CPU 18 to permit the passage of the variable-threshold signal received from the buffer 31G. In the absence of the command S the multiplexer 46 in contrast passes the binary signal coming from the circuit 42G.

According to the invention the scanning device is provided with a colour indication circuit sensitive to any colour of a pixel except black. That circuit comprises an ROM 47, for example with a 4K byte capacity, for recording a table for defining colours. In particular the ROM 47 is addressed by the four most significant bits of the data coming from the three buffers 31G, 31R and 31B and outputs on a conductor 48 a binary signal or bit indicative of the presence of at least one of the three colours (colour indication) with a value which is greater than a predetermined value, for example greater than 4. That bit is passed by way of a conductor 48' to the two zones 37 and 38 of the multiplexer 36 whereby it is recorded in association with the single bit of the binary monochrome pixel, or six bits of the level of the monochrome multilevel pixel.

The ROM 47 also outputs three bits on three other conductors 49; each of those three bits is representative of the presence of the corresponding colour, with a value greater than the above-mentioned predetermined value. Those three bits are compared in a comparator 51 with a mask M supplied by the CPU 18 in such a way as to emit a high-level signal if it does not correspond to the configuration present at the outputs 49 of the ROM 47, that is to say if the colours of the pixel do not correspond to the mixture of colours defined by the mask. The comparator 51 on the other hand emits a low signal when the mask corresponds to the configuration at the outputs 49.

In turn the CPU is capable of emitting a signal D at low level, in executing a particular instruction of the program, to effect suppression of the colour defined by the mask (drop out). An AND circuit 52 then outputs a signal only if the output of the comparator 51 and the signal D are at high level, that is to say in the absence of a command for suppression of the colour indicated by the mask, while in the presence of the colour of the mask or in the absence of the signal D, the AND circuit 52 is inhibited. An OR circuit 53 then applies to the zone 37 of the multiplexer 36 either the signals coming from the AND circuit 52 or those coming from the multiplexer 46.

From the multiplexer 36 the data are applied to the bus 27 (FIG. 1) and by way of the unit 26 and the bus 19 they are temporarily recorded in the RAM 21. In the situation of binary monochrome recording, for each scanning line the multiplexer 36 emits firstly a line of bits in respect of reading of the individual pixels and then a line of bits in respect of indication of colour. On the other hand, in the situation of multilevel monochrome reading the level indication signal is emitted by the multiplexer 36 as the seventh bit of each byte.

In both cases, the value one of the colour indication bit indicates the presence in the pixel of at least one of the primary colours while the value zero of that bit indicates an absence of colour, that is to say an image in black and white. Therefore, each line portion of the image containing at least one of the three primary colours is precisely defined in each case in the RAM 21. In accordance with such recordings, together with the commands which can be programmed by a successive colour scanning operation, the CPU 18 defines a window signal W (FIG. 2) which enables the reading operation for colour recording in only line portions in which the colour indication bit was recorded.

It will be clear from the foregoing that the operation of reading a document requires memory occupation corresponding to the selected reading mode. For example, for a document of A4 format with a degree of resolution of 8 pixels/mm, binary monochrome reading requires 0.5 Mbyte, multilevel monochrome reading requires 4 Mbytes, binary colour reading requires 1.5 Mbytes and multilevel colour reading requires 12 Mbytes. It will be clear that the CPU 18 (FIG. 1) can correspondingly control the scanning speed and the number of scanning operations, thereby optimising the reading cycle.

In particular the CPU 18 (see FIG. 1) can be programmed to control the scanning device in a first operation of scanning the document to record the signals in monochrome mode and in a second scanning operation which is limited to just the zones or windows of the document in which there is a colour indication, for recording therefrom signals in the colour mode. It will be appreciated that those signals will replace the monochrome signals in the recording, by providing for suitable translation of recording of the remainder of the document.

Figure 3:
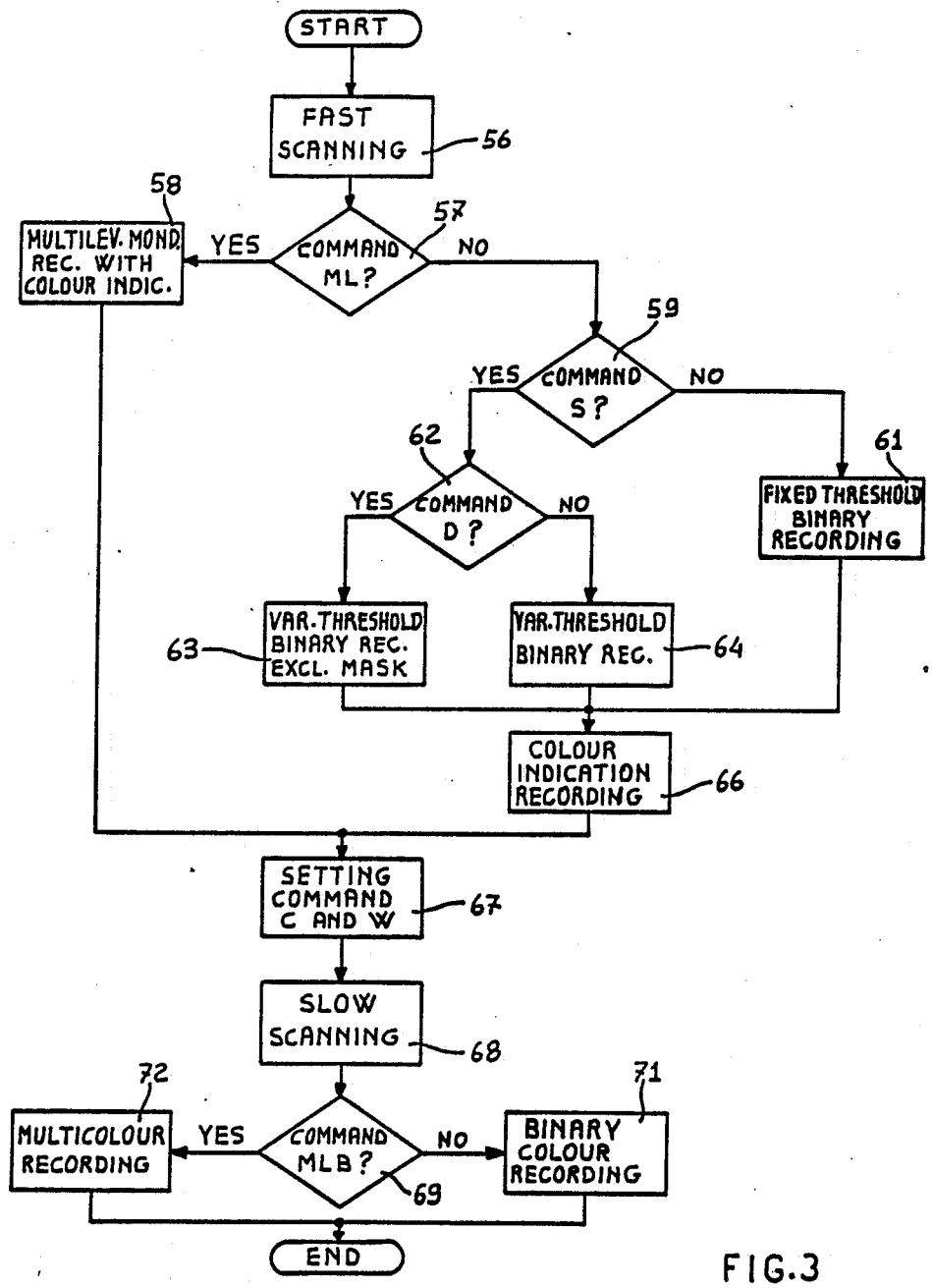
FIG. 3 is a flow chart in respect of operation of the apparatus shown in FIGS. 1 and 2.

FIG. 3 shows a chart as mentioned above. The block 56 indicates a series of operations for rapid scanning of the entire document for monochrome recording of the image. Such operations are effected on the basis of the commands which have been previously considered, being generated by the CPU 18. A sampling operation 57 is then effected to establish if binary recording is required, that is to say if the CPU 18 has emitted the command L which is different from ML. In a positive situation, an operation for recording a byte for each pixel read, in the RAM 21, is effected (block 58). That byte comprises the six bits which are indicative of the level of the pixel, which are associated with the colour indication which is recorded at the seventh bit.

If however the outcome of the sampling operation 57 is negative, another sampling operation 59 is effected to establish if there is the command S for reading with automatic regulation of the threshold. If the outcome of that sampling operation is negative, an operation 61 for binary recording of a bit for each pixel, with the threshold preset by the CPU 18, is effected.

If however the outcome of the sampling operation 59 is positive, a further sampling operation 62 is effected to establish if the command D exists for eliminating the colours defined by a mask M which is preset by the CPU 18. In both cases, the operations 63 and 64 respectively for binary recording of the reading signals with a variable threshold are effected. In the case of a positive outcome however the operation 63 is effected excluding the mixture of colours defined by the mask, the pixels of which are recorded as white pixels.

Alternating with the operations 61, 62 and 63, in each line of pixels, is an operation 66 for recording the bits of the colour indication of the line, whereby recording of the signals in respect of reading of the pixels of a line is followed by recording of the indication of colour in respect of the pixels of the same line. At the end of the operation of scanning the document, an operation 67 is effected, in which the CPU 18 emits the signal C. Now, for each pixel, the CPU 18 defines the window signal W on the basis of the recording of the colour indication effected in the operations 58 and 66. The command C now causes the scanning device to perform a slow scanning operation 68, limited to the zones in which the signal W occurs.

Another sampling operation 69 is now effected to establish if the command B is present. In the negative case, an operation 71 is effected, in which three bits for each pixel are recorded, in place of the single bit. If however the result of the sampling operation 69 is positive, an operation 72 is effected, in which three bytes per pixel are recorded, in place of each byte.

It will be appreciated that various modifications and improvements may be made in the above-described apparatus without thereby departing from the scope of the invention.

We claim:

1. An apparatus for reading and digital processing of colour images comprising a group of pluralities of elements (11G, 11R, 11B) for reading the individual pixels associated with the primary colours of the image for generating corresponding reading signals, and comprising reading mode selection means (36, C) for selection for monochrome output the reading signal generated by a predetermined one (11G) of said pluralities of elements characterised in that the group of pluralities of elements (11G, 11R, 11B) is operable to control a colour indication circuit (47) for indicating the presence of any colour in the image, the selection means (36) being capable of enabling that circuit to output the colour indication in association with the reading signal generated by the predetermined one plurality of elements (11G).

2. An apparatus according to claim 1, characterised in that the colour indication circuit (47,51) is also capable of indicating the presence in the image of each of the primary colours.

3. An apparatus according to claim 2, characterised in that the indication of presence of the colours is generated in binary form.

4. An apparatus according to claim 3, characterised by colour suppression means (52) which are conditioned by the selection means to suppress the output of the reading signals which are due to a predetermined mixture of the colours in the image.

5. An apparatus according to claim 4, characterised in that the colour indication circuit comprises a read only memory (47) capable of being addressed by at least a part of the digital signals generated by the group of pluralities of elements (11G, 11R, 11B) for generating the indication of colour and the presence of each colour.

6. An apparatus according to claim 5, characterised in that the suppression means comprise a mask (51, M)

which can be loaded with the signals of the mixture of colours to be suppressed.

7. An apparatus according to claim 6, characterised in that it is controlled by programmable logic means (18) capable of controlling the selection means (36) and the suppression means (51), the logic means also being capable of loading the mask (M).

8. An apparatus according to claim 7, characterised in that the logic means (18) are controlled by the colour indication in such a way as to enable the selection means (36) for a recording in colour of the respective pixels.

9. An apparatus according to claim 8, characterised in that the selection means (36) are thus enabled selectively in a second document scanning operation (68).

10. Apparatus according to claim 8, characterised by switching means (42G) controlled by the logic means (18) for switching the recording of the reading signals of the plurality of elements (11G,11R,11B) from binary to multilevel.

11. An apparatus according to claim 10, characterised by a circuit (44,43) for automatic threshold regulation associated with at least the predetermined one plurality of elements (11G) and capable of being conditioned by the logic means (18) for recording a binary reading signal based on the threshold defined by the regulation circuit.

12. An apparatus according to one of claims 7 to 11, characterised in that the logic means (18) comprise a programmable microprocessor capable of controlling said means and said circuits by way of a series of input and output ports (23).

* * * * *